(12) United States Patent
Kachi

(10) Patent No.: US 9,366,770 B2
(45) Date of Patent: Jun. 14, 2016

(54) EARTHQUAKE DETERMINATION SYSTEM AND SEISMIC ANALYSIS METHOD

(75) Inventor: Masaaki Kachi, Tokyo (JP)

(73) Assignee: A2 CO., LTD, Tokyo (JP)

( * ) Notice: Subject to any disclaimer, the term of this patent is extended or adjusted under 35 U.S.C. 154(b) by 1233 days.

(21) Appl. No.: 13/319,935

(22) PCT Filed: May 10, 2010

(86) PCT No.: PCT/JP2010/003206
§ 371 (c)(1),
(2), (4) Date: Dec. 9, 2011

(87) PCT Pub. No.: WO2010/137246
PCT Pub. Date: Dec. 2, 2010

(65) Prior Publication Data
US 2012/0078520 A1    Mar. 29, 2012

(30) Foreign Application Priority Data

May 29, 2009    (JP) .................................. 2009-131155

(51) Int. Cl.
| G01V 1/00 | (2006.01) |
| G01V 1/28 | (2006.01) |
| G01V 1/36 | (2006.01) |

(52) U.S. Cl.
CPC ................ *G01V 1/008* (2013.01); *G01V 1/288* (2013.01); *G01V 1/364* (2013.01)

(58) Field of Classification Search
CPC ..................................................... G01V 1/008
USPC .......................................................... 702/15
See application file for complete search history.

(56) References Cited

U.S. PATENT DOCUMENTS

2008/0285385 A1* 11/2008 Cherry ................... G01V 1/008
367/76

FOREIGN PATENT DOCUMENTS

| JP | 2006-105862 A | 4/2006 |
| JP | 2008096203 A | 4/2008 |
| JP | 2009115629 A | 5/2009 |

OTHER PUBLICATIONS

PCT International Search Report in corresponding JP Patent Application No. PCT/JP2010/003206, dated Jul. 13, 2010 (3 pages).
PCT Written Opinion of the International Searching Authority in corresponding JP Patent Application No. PCT/JP2010/003206, dated Jul. 13, 2010 (6 pages).

* cited by examiner

*Primary Examiner* — Bryan Bui
(74) *Attorney, Agent, or Firm* — Thomas B. Ryan, Patent Agent; Harter Secrest & Emery LLP

(57) ABSTRACT

An earthquake determination system which includes a plurality of observation terminal devices are connected by a communication network. When estimated P-wave detection information is received from the plurality of the observation terminal devices, a distance D between the observation terminal devices and a time interval δ between detection times are acquired and when transmission limit distance of local vibration energy is DSL, the minimum propagation speed of the earthquake P waves is SP, and the maximum detection error between detection times by the pair of observation terminal devices is Δt, the seismic analysis processor determines occurrence of an earthquake, if the both of the two pairs of the observation terminal devices satisfy the relationships of 2DSL<D and δ<D/SP+Δt.

5 Claims, 7 Drawing Sheets

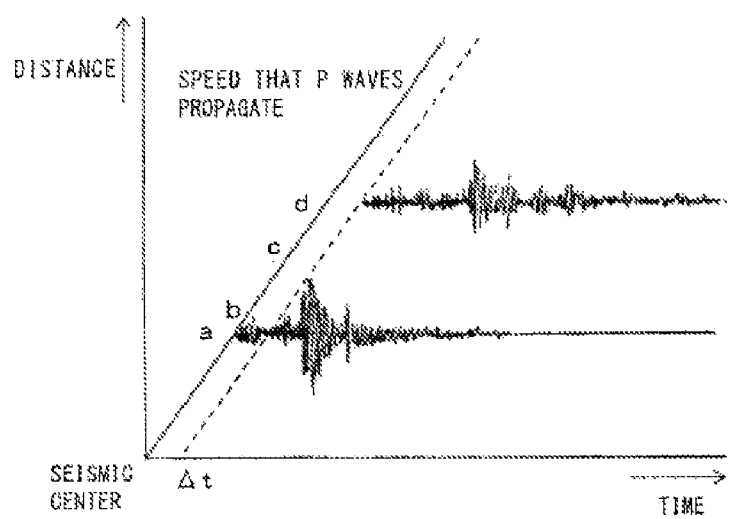

TIME AND DATE OF EARTHQUAKE OCCURRENCE  2009/02/20 18:17:21.0

P-WAVE DETECTION TIME OF TERMINAL a  2009/02/20 18:17:30.507 a (b)

P-WAVE DETECTION TIME OF TERMINAL b  2009/02/20 18:17:30.506

P-WAVE ARRIVAL TIME INTERVAL BETWEEN a AND b  0.229sec<2.8km/Ps a ←→ b
2.8 km (c)

P-WAVE DETECTION TIME OF TERMINAL c  2009/02/20 18:17:30.553

P-WAVE ARRIVAL TIME INTERVAL BETWEEN a AND c  0.046sec<2.1km/Ps

P-WAVE ARRIVAL TIME INTERVAL BETWEEN b AND c  0.017sec<2.3km/Ps 2.1 km, c, 2.3 km
a, b (d)

P-WAVE DETECTION TIME OF TERMINAL d  2009/02/20 18:17:30.611

P-WAVE ARRIVAL TIME INTERVAL BETWEEN b AND d  0.075sec<5.3km/Ps c
a  b ←→ d
     5.3 km

✕ EPICENTER

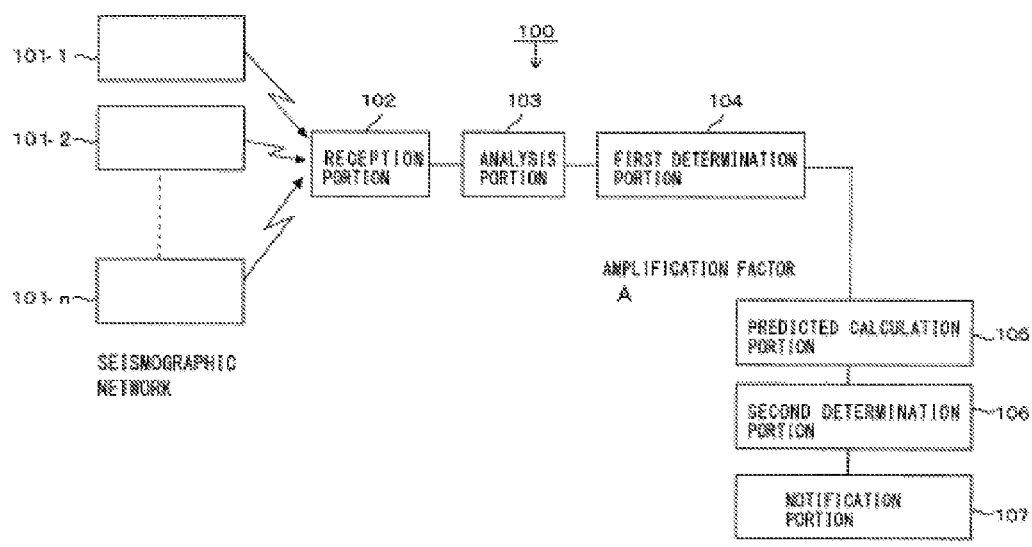
Prior Art

EARTHQUAKE DETERMINATION SYSTEM AND SEISMIC ANALYSIS METHOD

TECHNICAL FIELD

The present invention relates to an earthquake determination system or a seismic analysis method which determines occurrence of an earthquake at an early stage from vibration at an installed position where an observation terminal device makes observation and more particularly to an earthquake determination system or a seismic analysis method which determines occurrence of an earthquake at an early stage without erroneous determination on the basis of vibration observation information received from a plurality of the observation terminal devices connected to a communication network.

BACKGROUND ART

Since it is extremely difficult to predict occurrence of an earthquake, an emergency earthquake alert system is proposed in which earthquake information including earthquake occurrence time, seismic center location and earthquake size is calculated on the basis of earthquake observation information of earthquake P waves observed at a large number of earthquake observation points, and predicted arrival time predicted from the earthquake information and magnitude are informed to an area where earthquake S waves, which are main vibration, have not reached immediately after occurrence of an earthquake (Patent Document 1).

FIG. 7 is a block diagram illustrating this prior-art emergency earthquake alert system 100, in which a large number of seismographic networks 101-1, 101-2 . . . 101-n installed at earthquake observation areas throughout the country are connected to a seismic analysis processor through a common communication network, and if a receiving portion 102 of the seismic analysis processor receives a seismic waveform from any of the seismographic networks 101, an analysis portion 103 analyzes it, calculates three elements of earthquake (earthquake occurrence time, seismic center location, and earthquake size) and acquires a radius of felt area from a distance from the seismic center location and the earthquake size.

A first determination portion 104 determines whether earthquake information will be informed or not on the basis of information regarding whether the earthquake size is such that the seismic intensity scale of the Japan Meteorological Agency is a certain value or more at a specific location or the distance from the seismic center location is within a radius of felt area acquired by the analysis portion 103. Also, a prediction calculation portion 105 acquires standard intensity at a specific location form the distance from the seismic center location, the depth and the earthquake size and also acquires an amplification factor to be set from differences in the geological structure, building structure and the like at the specific location, and calculates earthquake parameters such as predicted intensity, maximum acceleration, predicted arrival time of earthquake S waves and the like at the specific location from the standard intensity and the amplification factor.

However, since the vibration detected by the seismographic networks 101 includes living noise such as lightning strike, construction work, traveling of vehicles and the like other than the earthquake waves, it is necessary to determine whether the detected vibration is vibration caused by earthquake P waves or vibration caused by living noise, and since determination requires predetermined time, calculation of the three elements of earthquake (earthquake occurrence time, seismic center location, and earthquake size) is delayed in the end and an alert for a near-field earthquake could not be made in time.

Thus, an alert system (Patent Document 2) in which a plurality of seismometers are installed around a specific area, and if the intensity of S waves estimated from the maximum value of a speed in a perpendicular direction of the earthquake P waves detected by any of the seismometers exceeds a set level, an alert is issued to the specific area or a seismographic data collection system (Patent Document 3) in which observation data obtained when a plurality of observatories observe a seismic motion having the size larger than a given setting is collected by a data collection center, and required information such as seismic intensity immediately after occurrence of an earthquake is obtained are proposed.

However, in the above-described method in which it is determined to be occurrence of an earthquake if earthquake intensity detected by a seismometer exceeds a set level, even if vibration caused by a living noise exceeds the set level, it is erroneously determined to be an earthquake, and an earthquake alert is not sufficiently reliable. As a method to solve this, an alert cancellation method (Patent Document 4) is known in which an alert issued upon a first break of P waves is cancelled by verifying the alert when S waves arrive and if the alert is found to be unnecessary.

Citation List

Patent Literature

Patent Document 1: Japanese Patent No. 3755131
Patent Document 2: Japanese Unexamined Patent Application Publication No. 2009-32141
Patent Document 3: Japanese Unexamined Patent Application Publication No. H06-331752
Patent Document 4: Japanese Unexamined Patent Application Publication No. 2008-275586

SUMMARY OF INVENTION

Technical Problem

In the emergency earthquake alert system 100 described in Patent Document 1, since each of the seismographic networks 101 discriminates only earthquake P waves in comparison with living noises and transmits only the earthquake waveforms of the earthquake P waves to the seismic analysis processor, discrimination of the earthquake P waves requires time and determination of occurrence of an earthquake is delayed.

Also, in the earthquake determination methods disclosed in Patent Documents 2 and 3 in which detection of earthquake P waves is determined from shaking intensity in the perpendicular direction, though occurrence of an earthquake can be determined to be an earthquake at an early stage, living noises causing shaking in the perpendicular direction at predetermined level is also determined to be an earthquake, and reliability of an earthquake alert is low, and confusion might be caused.

Moreover, in the alert cancellation method disclosed in Patent Document 4 in which the alert is cancelled if determination that the earthquake P waves are detected is verified to be erroneous when earthquake S waves arrive in order to solve the problems, since determination of occurrence of an earthquake cannot be confirmed until the earthquake S waves arrive, warning for occurrence of an earthquake or issuance of an earthquake alert cannot be made before arrival of the earthquake S waves in the end, which is not practical.

The present invention was made in view of the prior-art problems as above and has an object to provide an earthquake determination system or a seismic analysis method which determines occurrence of an earthquake at an early stage and with accuracy.

Also, the present invention has an object to provide a seismic analysis method of obtaining seismographic information, which is actual measurement information from a large number of observation terminal devices without causing convergence of communication networks after determination of occurrence of an earthquake at an early stage.

Solution to Problem

In order to achieve the above-described objects, an earthquake determination system in claim 1 is an earthquake determination system in which a plurality of observation terminal devices installed in a dispersed manner at random areas and a seismic analysis processor are connected by a communication network, and the seismic analysis processor determines occurrence of an earthquake on the basis of vibration observation information transmitted through the communication network by the observation terminal device which observed vibration at an installed position, in which each observation terminal device includes a seismometer which outputs vibration waveform information at the installed position and a simplified earthquake determination portion which estimates detection of earthquake P waves from the vibration waveform information outputted by the seismometer and transmits estimated P-wave detection information including detection time of the estimated earthquake P waves and installed position information of itself as the vibration observation information to the seismic analysis processor, when the simplified earthquake determination portion estimates detection of the earthquake P waves, and the seismic analysis processor includes an earthquake analysis portion which determines occurrence of an earthquake from the received estimated P-wave detection information, when the estimated P-wave detection information is received from a plurality of the observation terminal devices; and the earthquake analysis portion acquires a distance D between the observation terminal devices and a time interval δ between detection times from the detection time of the estimated earthquake P waves and installed position information included in each pair of the estimated P-wave detection information in at least two pairs of combinations of the observation terminal devices among the plurality of observation terminal devices which transmitted the estimated P-wave detection information and when a transmission limit distance of local vibration energy is $D_{SL}$, the minimum propagation speed of the earthquake P waves is $S_P$, and the maximum detection error between detection times by the pair of combinations of observation terminal devices is $\Delta t$, if the both of the two pairs of the observation terminal devices satisfy the relationships of $2D_{SL}<D$ and $\delta<D/S_P+\Delta t$, it is determined to be occurrence of an earthquake.

Since the simplified earthquake determination portion only estimates detection of the earthquake P waves without accurately determining detection of the earthquake P waves from the vibration waveform information, the estimated P-wave detection information including the detection time of the estimated earthquake P waves and the installed position information of itself can be transmitted to the seismic analysis processor at an early stage.

To the pair of observation terminal devices which satisfy the relationship of $2D_{SL}<D$, local vibration energy caused by the same living noise is not transmitted, and the estimated earthquake P waves detected by the pair of observation terminal devices within the time interval δ between the detection times which satisfies $\delta<D/S_P+\Delta t$ are not those obtained by detecting the same living noise. Also, since time during which the earthquake P waves propagate to a point away by the distance D is at least shorter than $D/S_P$, if the time interval δ between the detection times by the pair of observation terminal devices satisfies $\delta<D/S_P+\Delta t$, it can be estimated that substantially the same earthquake P waves are detected. Therefore, regarding the two pairs of combinations of the observation terminal devices, if the distance D between the pair of observation terminal devices satisfies the relationships of $2D_{SL}<D$ and $\delta<D/S_P+\Delta t$, it can be estimated with an extremely high probability that the same earthquake P waves were detected, and occurrence of an earthquake can be determined without an error at an early stage.

The earthquake determination system in claim 2 is characterized in that the two pairs of combinations are formed of, among three observation terminal devices Ln, Ln+1, and Ln+2 from which the seismic analysis processor has continuously received the estimated P-wave detection information, the observation terminal device Ln+2 which received in the third place and either one of the remaining two observation terminal devices Ln and Ln+1 as the other of one pair, respectively.

At the stage in which the estimated P-wave detection information is received from the third observation terminal device Ln+2, occurrence of an earthquake can be determined by comparing each pair of the observation terminal devices in the two pairs of combinations to see if they satisfy the relationships of $2D_{SL}<D$ and $\delta<D/S_P+\Delta t$ or not.

A seismic analysis method in claim 3 is a seismic analysis method in which the plurality of observation terminal devices installed in a dispersed manner at random areas and the seismic analysis processor are connected through the communication network and the seismic analysis processor analyzes an occurrence situation of an earthquake on the basis of vibration observation information transmitted through the communication network by the observation terminal device which observed vibration at the installed position, characterized in that (1) the observation terminal device provided with a seismometer which outputs the vibration waveform information at the installed position and the simplified earthquake determination portion which estimates detection of the earthquake P waves from the vibration waveform information outputted by the seismometer transmits the estimated P-wave detection information including the detection time of the estimated earthquake P waves and the installed position information of itself as the vibration observation information to the seismic analysis processor if the simplified earthquake determination portion estimates detection of the earthquake P waves; and (2) when the estimated P-wave detection information is received from the plurality of observation terminal devices, the seismic analysis processor acquires the distance D between the observation terminal devices and the time interval δ between detection times from the detection time of the estimated earthquake P waves and installed position information included in each pair of the estimated P-wave detection information in at least two pairs of combinations of the observation terminal devices among the plurality of observation terminal devices which transmitted the estimated P-wave detection information and when the transmission limit distance of local vibration energy is $D_{SL}$, the minimum propagation speed of the earthquake P waves is $S_P$, and the maximum detection errors between detection times by the pair of observation terminal devices is $\Delta t$, if the both of the two pairs of combinations of the observation terminal devices satisfy the relationships of $2D_{SL}<D$ and $\delta<D/S_P+\Delta t$, it is determined to be occurrence of an earthquake.

In the process of (1), since the simplified earthquake determination portion only estimates detection of the earthquake P waves with more simplified requirements without waiting for reliable detection determination of the earthquake P waves from the vibration waveform information at the installed position, the estimated P-wave detection information including the detection time of the estimated earthquake P waves and the installed position information of itself can be transmitted to the seismic analysis processor at an early stage.

In the process of (2), to the pair of observation terminal devices which satisfy the relationship of $2D_{SL}<D$, local vibration energy caused by the same living noise is not transmitted, and the estimated earthquake P waves detected by the pair of observation terminal devices within the time interval $\delta$ between the detection times which satisfies $\delta<D/S_P+\Delta t$ do not include the living noise having the same occurrence cause. Also, since time during which the earthquake P waves propagate to a point away by the distance D is at least shorter than $D/S_P$, if the time interval $\delta$ between the detection times by the pair of observation terminal devices satisfies $\delta<D/S_P+\Delta t$, it can be estimated that substantially the same earthquake P waves are detected. Therefore, regarding the two pairs of combinations of the observation terminal devices, if each pair of the observation terminal devices satisfies the relationships of $2D_{SL}<D$ and $\delta<D/S_P+\Delta t$, it can be estimated with an extremely high probability that the same earthquake P waves were detected, and occurrence of an earthquake can be determined without an error at an early stage.

The seismic analysis method in claim 4 is characterized in that (3) the observation terminal device has an earthquake waveform analysis portion continuously analyze the vibration waveform information outputted by the seismometer along with the above (1) at least from the estimated earthquake P-wave detection time; (4) the seismic analysis processor determines each pair of observation terminal devices as effective observation terminal devices when determination to be occurrence of an earthquake in the above (2) is made and notifies the effective observation terminal devices that the estimated earthquake P waves are the earthquake P waves; (5) the earthquake waveform analysis portion of the effective observation terminal device which receives the notification of the above (4) from the seismic analysis processor obtains the earthquake wave analysis information by waveform analysis of the earthquake waves continued from the estimated earthquake P waves as the earthquake P waves, and the effective observation terminal device consecutively transmits the earthquake wave analysis information as vibration observation information to the seismic analysis processor; and (6) the seismic analysis processor analyzes earthquake occurrence time, seismic center location, and earthquake size on the basis of the earthquake wave analysis information transmitted from the effective observation terminal devices.

In the process of (4), since the observation terminal device receives notification from the seismic analysis processor that the estimated earthquake P waves are earthquake P waves, the seismic intensity of the earthquake S waves arriving at the installed position with a delay can be predicted from the seismic intensity of the detected estimated earthquake P waves, and an alert can be issued to the periphery.

In the process of (5), the effective observation terminal devices which can estimate detection of the same earthquake P waves with an extremely high probability are observation terminal devices installed in the vicinity of the seismic center, and since the effective observation terminal devices consecutively transmit the earthquake wave analysis information of the earthquake waves continued from the earthquake P-wave detection time to the seismic analysis processor in the process of (5), the seismic analysis processor can analyze the earthquake occurrence time, seismic center location, and earthquake size at an early stage after determination to be an earthquake.

Since the earthquake observation information is transmitted from the limited number of effective observation terminal devices close to the seismic center, there is no convergence of communication networks, and the seismic analysis processor receives the consecutively transmitted earthquake wave analysis information without delay.

The seismic analysis method in claim 5 is characterized in that (7) when the seismic analysis processor receives the estimated P-wave detection information from the observation terminal device different from the effective observation terminal device in the above (4), the seismic analysis processor acquires a distance D' between the observation terminal devices and a time interval $\delta'$ between the detection times from the detection time of the estimated earthquake P waves and the installed position information included in the pair of the estimated P-wave detection information received from the observation terminal device and one of the effective observation terminal devices, and if the pair of observation terminal device and the one effective observation terminal device satisfy $2D_{SL}<D'$ and $\delta'<D'/S_P+\Delta t$, the observation terminal device is added to the effective observation terminal devices, and the above (4) to (6) are performed.

If the observation terminal device forming a pair with the effective observation terminal device which detected the estimated earthquake P waves satisfies $2D_{SL}<D'$ and $\delta'<D'/S_P+\Delta t$, it can be estimated that the same estimated earthquake P waves are propagated and detected, and the observation terminal device is added to the effective observation terminal devices.

By means of performance of the above process of (4) to the observation terminal devices, the observation terminal device which detected the earthquake P waves with a delay can receive the notification that the estimated earthquake P waves are earthquake P waves, predict the seismic intensity of the earthquake S waves arriving at the installed position with a delay from the seismic intensity of the detected estimated earthquake P waves and issue an alert to the periphery.

By means of performance of the above process of (5) by the observation terminal device, the earthquake wave analysis information of the earthquake waves is consecutively transmitted to the seismic analysis processor from the observation terminal device further away from the seismic center, and thus, the seismic analysis processor can analyze the earthquake occurrence time, seismic center location, and earthquake size from the large quantity of earthquake wave analysis information in a wider area at an early stage and accurately.

Advantageous Effects of Invention

According to the invention in claims 1 and 3, at an early stage when at least three observation terminal devices detect the earthquake P waves, occurrence of an earthquake can be determined with an extremely high probability.

Also, even if a large number of the observation terminal devices are arranged in a dispersed manner at random areas, the number of the observation terminal devices which detect the earthquake P waves by the time of determination of occurrence of an earthquake and transmit the estimated P-wave detection information to the seismic analysis processor is several, and no convergence of the communication networks occur, and thus, the estimated P-wave detection information can be obtained by the seismic analysis processor without a delay.

According to the invention in claim 2, at a stage in which the estimated P-wave detection information is received from at least three observation terminal devices, occurrence of an earthquake can be determined.

According to the invention in claim 4, the observation terminal device can predict seismic intensity of the earthquake S waves arriving at the installed position with a delay and issues an alert to the periphery without an error.

Also, the seismic analysis processor can analyze the earthquake occurrence time, seismic center location, and earthquake size at an early stage on the basis of the seismographic information transmitted from the observation terminal device close to the seismic center after determination to be an earthquake.

Also, since the earthquake wave analysis information is transmitted from the limited number of effective observation terminal devices close to the seismic center, there is no convergence of communication networks and the earthquake wave analysis information consecutively transmitted can be transmitted to the seismic analysis processor without delay.

According to the invention in claim 5, the observation terminal device which detected the earthquake P waves with a delay can also predict the seismic intensity of the earthquake S waves arriving at the installed position and can issue an alert to the periphery without an error.

Also, since the seismic analysis processor can obtain earthquake wave analysis information from the large number of observation terminal devices installed in a wider area, the earthquake occurrence time, seismic center location, and earthquake size can be analyzed more accurately.

BRIEF DESCRIPTION OF DRAWINGS

FIG. 5 is an explanatory diagram illustrating a propagation state of the earthquake P waves.

FIG. 6 is explanatory diagrams illustrating a relationship between an installed position of each of observation terminals a, b, c, and d and estimated earthquake P-wave detection time (a) when a seismic analysis processor 30 receives estimated P-wave detection information from the observation terminal a, (b) when the seismic analysis processor 30 receives the estimated P-wave detection information from the observation terminal b, (c) when the seismic analysis processor 30 receives the estimated P-wave detection information from the observation terminal c, and (d) when the seismic analysis processor 30 receives the estimated P-wave detection information from the observation terminal d.

FIG. 7 is a block diagram illustrating a conventional emergency earthquake alert system 100.

DESCRIPTION OF EMBODIMENTS

Figure 1:
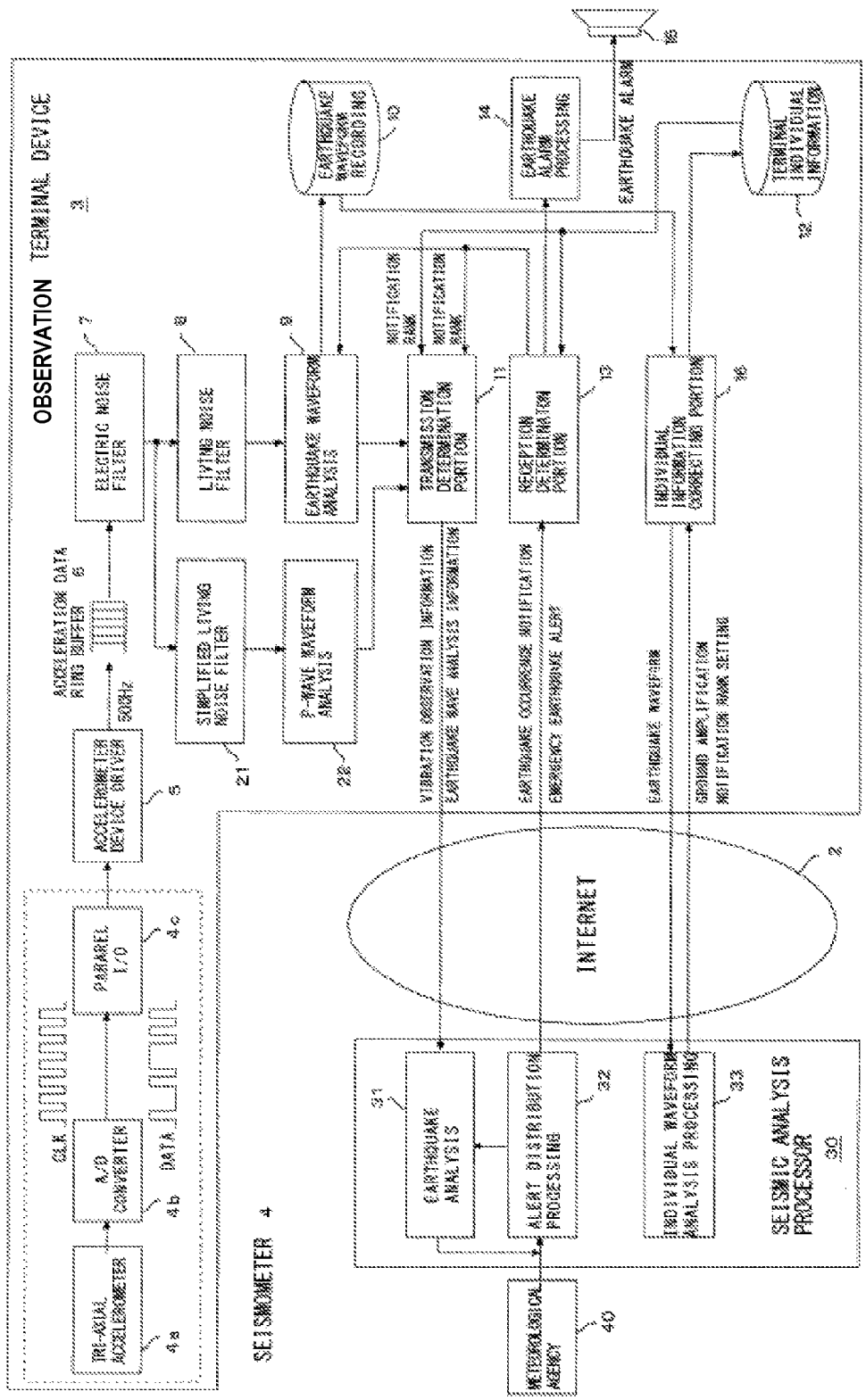
FIG. 1 is a block diagram illustrating an earthquake determination system 1 according to an embodiment of the present invention.

An earthquake determination system 1 and a seismic analysis method according to an embodiment of the present invention will be described by using FIGS. 1 to 6. FIG. 1 is a block diagram illustrating an entire configuration of the earthquake determination system 1, in which a large number of observation terminal devices 3, 3, . . . installed in a dispersed manner at random areas and a seismic analysis processor 30 are connected through the internet 2, which is a communication network.

The observation terminal device 3 is installed at a position hardly affected by living noises of a building and at a location where an alarm can be delivered to people living in the building, which will be described later, and incorporates a simplified-type seismometer 4 which detects vibration at the installed position, whereby it functions as an earthquake observation point. The seismometer 4 is formed of a tri-axial accelerometer 4a which detects acceleration caused by vibration at the installed position in three axial directions of X-, Y-, and Z-directions orthogonal to each other, an A/D converter 4b which outputs analog detected values detected by the tri-axial accelerometer 4a as digital values synchronized with clock signals, respectively, and a parallel interface 4c which outputs a digital acceleration detected value to an accelerometer device driver 5.

Each of the acceleration detected values in the three axial directions outputted from the accelerometer device driver 5 is temporarily stored in a ring buffer 6 in which the detected value is rewritten to an acceleration detected value newly inputted at a cycle of 500 Hz. Since the acceleration waveform continued from each acceleration detected value in the three axial directions changes with the same waveform as displacement in the same direction, this is regarded as a displacement waveform including an earthquake waveform in each direction and is passed through an electric noise filter 7.

The electric noise filter 7 estimates that a vibration frequency or a vibration waveform that cannot be regarded as vibration caused by an earthquake is an electric noise and removes it from the displacement waveform in output, and a quantization noise superimposed by the A/D converter 4b on the acceleration detected value or the like is removed by this electric noise filter 7, for example.

The displacement waveform outputted from the electric noise filter 7 is outputted to two types of noise filters with different removal accuracy, that is, a simplified living noise filter 21 and a living noise filter 8, and living noise removal processing is executed in parallel in these filters 21 and 8. The displacement waveform detected by the seismometer 4 might include various living noises that are close to earthquake waves such as vibration of a refrigerator or the like, running of a vehicle, up and down elevation of an elevator, a construction work, a lightning strike and the like in the vicinity of the installed position of the seismometer 4, and these living noises have characteristics in general that the noises can occur with specific and repeated vibration frequencies or vibration waveforms and contain a lot of high frequencies, while the earthquake waves have characteristics that the earthquake waves have lower specific frequencies, and the amplitude gradually becomes bigger.

In the living noise filter 8, various types of vibration frequencies, amplitudes, and vibration waveforms included in the displacement waveform outputted from the electric noise filter 7 are monitored in sufficient time of several seconds at the maximum, the various features of the above living noises are compared, the living noise which matches any one of the features is removed and the rest is outputted to an earthquake waveform analysis portion 9.

The earthquake waveform analysis portion 9 temporarily stores vibration waveform information of the vibration frequencies and vibration waveforms of the displacement waveform inputted from the living noise filter 8 in an earthquake waveform recording portion 10. After that, if a notification of occurrence of an earthquake, which will be described later, is received from the seismic analysis processor 30, the vibration waveform information from the estimated earthquake P waves stored in the earthquake waveform recording portion 10 is considered to be vibration waveform information of the earthquake waveform and is read out of the earthquake waveform recording portion 10. The earthquake waveform analysis portion 9 consecutively analyzes the characteristics of the earthquake waveform such as the type, amplitude, detection time and the like of the earthquake waveform from the read-out vibration waveform information and outputs the result to a transmission determination portion 11 as earthquake waves analysis information. Also, from the intensity of the estimated earthquake P waves of the read-out vibration waveform information, predicted intensity of the earthquake S waves is acquired, and if the predicted intensity of the earthquake S waves is not less than predetermined intensity, occurrence of an earthquake is outputted in sound from a speaker 15 together with the predicted intensity of the earthquake, and an earthquake alarm is issued.

On the other hand, the simplified living noise filter 21 into which the displacement waveform is inputted from the electric noise filter 7 in parallel with the living noise filter 8 removes only the living noise that can be determined obviously to be living noise such as noise of a specific vibration frequency frequented at the installed position with the purpose of detecting the earthquake P waves at an earlier stage and outputs the rest to a P-wave waveform analysis portion 22.

As described above, the earthquake P waves observed in the past have a characteristic that the waves vibrate at a dominant frequency and the amplitude thereof gradually gets bigger, and the P-wave waveform analysis portion 22, which is a simplified earthquake determination portion, estimates detection of the earthquake P waves if the change of the vibration frequency or amplitude in the inputted displacement waveform approximates the characteristics of the earthquake P waves and outputs detection time (indicated by double circles in FIGS. 2 and 3) when the estimated earthquake P waves are first detected by the seismometer 4 to the transmission determination portion 11.

The transmission determination portion 11 connected to the outputs of the earthquake waveform analysis portion 9 and the P-wave waveform analysis portion 22 immediately gives an identification code to the estimated P-wave detection information including the detection time and the installed position information of the observation terminal device 3 if the detection time of the estimated earthquake P waves is inputted from the P-wave waveform analysis portion 22 and transmits it as vibration observation information to the seismic analysis processor 30 through the internet 2. Also, if the earthquake wave analysis information is inputted from the earthquake waveform analysis portion 9, it is determined whether or not the earthquake wave analysis information is to be transmitted on the basis of the notification requirement set for the observation terminal device 3.

In each observation terminal device 3, installation points obtained by collecting points in accordance with an installation point distribution table illustrated in Table 1 and notification ranks (LV) for each observation terminal device 3 on the basis of a notification rank (LV) distribution table illustrated in Table 2 are set, and the set notification rank (LV) is stored in a terminal individual information recording portion 12. The notification rank (LV) is to become a notification requirement in determination on whether or not the earthquake wave analysis information is to be transmitted as the vibration observation information from the observation terminal device 3, but here, a predetermined code (S, for example) is set as the notification requirement for the observation terminal device 3 from which the seismic analysis processor 30 requests transmission of the earthquake wave analysis information of the earthquake S waves other than the notification rank (LV). The terminal individual information recording portion 12 stores vibration number specific to the installed position of the observation terminal device 3, quake amplification A and the like in addition to these notification requirements.

TABLE 1

| Structure of the building | Total number of floors in the building | Installed floor | Fixed position | Periphery of the installed spot | Accelerometer accuracy |
|---|---|---|---|---|---|
| Steel-framed reinforced concrete + 0 Timber + 10 Seismic isolated + 500 | One-story building + 0 2 to 5-story building + 10 6 to 15-story building + 50 15-story or more + 100 | Ground + 0 1st floor + 10 2nd to 5th floor + 30 6 to 15th floor + 50 15th floor + 100 | Ground (concrete) + 0 Floor + 10 Wall + 30 Column + 50 | Along railway/national road + 300 Speaker/refrigerator/ machine + 500 Air-conditioner/door/automatic door + 200 Crowded space + 200 Close to elevator + 100 | 0.1 gal X1 1 gal X100 |

The installation point distribution table in Table 1 has six items including the structure of the building, the total floors of the building and the like and is set such that the installation point becomes higher for each factor which deteriorates earthquake observation accuracy. For example, in the case of a 14-story building having a reinforced concrete structure along a national road, in which the observation terminal device 3 having relatively highly accurate seismometer 4 at 0.1 gal installed on the floor of a room close to an elevator on the 10th floor, the installation point becomes the total of points underlined in Table 1, which is 510 points.

TABLE 2

| Installation density | Small <- installation point -> large | | | | |
|---|---|---|---|---|---|
| 5 units or more in radius of 1 km | LV1 | LV5 | LV10 | LV15 | — |
| 5 units or more in 2 km | LV1 | LV4 | LV8 | LV12 | — |
| 5 units or more in 5 km | LV1 | LV3 | LV5 | LV7 | — |
| 3 or 4 units in 5 km | LV1 | LV2 | LV3 | LV4 | — |
| 2 units or less in 5 km | | | LV1 | | |

The notification rank (LV) distribution table in Table 2 sets the notification rank (LV) in accordance with the installation density of the other observation terminal devices 3 around the observation terminal device 3 to be installed, and if a plurality of the observation terminal devices 3 are installed in the periphery, all the observation terminal devices 3 in the area are sorted in accordance with the order of installation points, and the notification rank (LV) from a low level to a high level is set in the order from the observation terminal device 3 at a low installation point to the observation terminal device 3 at a high point. Also, the notification rank (LV) in the sorting order is set such that a higher-level notification rank is set for an area with higher installation density than lower, and as a result, if a plurality of the observation terminal devices 3, 3 . . . are installed in the vicinity, by selecting a low notification rank (LV), the observation terminal device group to transmit the earthquake wave analysis information can be designated with priority from the observation terminal device 3 with high earthquake observation accuracy. For example, suppose that four units of the observation terminal devices 3 including an observation terminal device 3 having the installation point of 510 points are set in an area within 5 km from the observation terminal device 3 and suppose that the installation point of 510 points is the second lowest value of the four units of the observation terminal devices 3, the notification rank of the LV2 is set from Table 2.

The reception determination portion 13 connected to the internet 2 can receive an earthquake occurrence notification delivered to a specific effective observation terminal device 3' when the seismic analysis processor 30 determines occurrence of an earthquake, which will be described later, and an emergency earthquake alert delivered to all the observation terminal devices 3 from an alert distribution processing portion 32 of the seismic analysis processor 30. If an earthquake occurrence notification is received, the identification code included in the earthquake occurrence notification is outputted to the earthquake waveform analysis portion 9, and the earthquake waveform analysis portion 9 identifies the estimated P-wave detection information transmitted on the basis of the identification code and executes the above-described processing.

Also, if the emergency earthquake alert is received, from earthquake information indicating earthquake occurrence time, seismic center location, and the earthquake size included in the emergency earthquake alert and the distance between the installed position thereof and the seismic center location, predicted arrival time of the earthquake P waves, predicted arrival time of the earthquake S waves, and standard predicted intensity by the earthquake S waves are calculated, and if the quake amplification A specific to the installed position is stored in the terminal individual information storage portion 12, the predicted intensity obtained by multiplying the standard predicted intensity by the quake amplification A is calculated. After that, the notification requirements such as the notification rank, code, and the like of the terminal specific information included in the emergency earthquake alert are outputted to the transmission determination portion 11 together with the predicted arrival time of the earthquake P waves and the predicted arrival time of the earthquake S waves calculated as above.

The predicted arrival time of the earthquake S waves calculated in the reception determination portion 13 and the standard predicted intensity or predicted intensity of the earthquake S waves are also outputted to an earthquake alarm processing portion 14, and if the standard predicted intensity or predicted intensity is not less than predetermined intensity, the standard predicted intensity or predicted intensity and time until the earthquake S waves will arrive are outputted in sound from the speaker 15, and an earthquake alarm is issued.

The observation terminal device 3 is further provided with an individual information correcting portion 16 connected to the individual waveform analysis processing portion 33 of the seismic analysis processor 30 through the internet 2. The individual information correcting portion 16 reads out the earthquake waveform information of the earthquake P waves or the earthquake S waves stored in the earthquake waveform storage portion 10 in accordance with an earthquake waveform transmission request delivered from the individual waveform analysis processing portion 33 of the seismic analysis processor 30 by using a time zone in which a traffic of the internet 2 between the seismic analysis processor 30 and each of the observation terminal devices 3, 3, . . . is small and transmits it to the individual waveform analysis processing portion 33. Also, if the corrected notification rank or quake amplification A, which will be described later, is received from the individual waveform analysis processing portion 33, the notification rank or quake amplification A stored in the terminal individual information recording portion 12 is rewritten by this corrected data.

The seismic analysis processor 30 is provided with an earthquake analysis portion 31, the alert distribution processing portion 32, and the individual waveform analysis processing portion 33. The earthquake analysis portion 31 determines occurrence of an earthquake on the basis of the detection time and the installed position information of the observation terminal device 3 included in the estimated P-wave detection information received from at least three units of the observation terminal devices 3. That is, the earthquake analysis portion 31 acquires a distance D between the observation terminal devices and a time interval $\delta$ between detection times in at least two pairs of combinations of the observation terminal devices 3 and 3 in the plurality of observation terminal devices 3, 3 . . . which transmitted the estimated P-wave detection information from the detection time of the estimated earthquake P waves and installed position information included in the estimated P-wave detection information, and when a transmission limit distance of local vibration energy is $D_{SL}$, the minimum propagation speed of the earthquake P waves is $S_P$, and the maximum detection error between detection times by the pair of observation terminal devices 3 is $\Delta t$, if $2D_{SL} < D$ and $\delta < D/S_P + \Delta t$ is satisfied, it is determined to be occurrence of an earthquake.

Condition of $2D_{SL} < D$.

In general, locally generated vibration energy such as lightning strike, construction work and the like is not transmitted in a wide range unlike an earthquake having a large-scale vibration energy. The above-described transmission limit distance $D_{SL}$ of local vibration energy is a distance between the occurrence source and the observation terminal device 3 when the vibration by the locally generated vibration energy other than the earthquake is attenuated to an amplitude which is not misjudged to be the estimated earthquake P waves in the P-wave waveform analysis portion 9 of the observation terminal device 3 away from the occurrence source, and in this embodiment, the transmission limit distance $D_{SL}$ is set at 0.5 km and compared with the distance D between the pair of observation terminal devices 3 and 3. Therefore, the locally generated local vibration energy other than earthquakes is not transmitted to either of the pair of observation terminal devices 3 and 3 which satisfy $2D_{SL}<D$, and even if the pair of observation terminal devices 3 and 3 detect the estimated earthquake P waves which satisfy $\delta<D/S_P+\Delta t$, the estimated earthquake P waves do not include living noise caused by the same phenomenon other than earthquakes.

In this embodiment, since at least one of the estimated P-wave detection information transmitted from the pair of observation terminal devices 3 for which the distance D between them is within 1 km is ignored, even if an earthquake occurs in an area in which a large number of observation terminal devices 3 are closely installed, occurrence of an earthquake can be determined at an early stage on the basis of the estimated P-wave detection information transmitted from the limited number of observation terminal devices 3. Also, the number of observation terminal devices 3 recognized as an effective observation terminal devices 3', which will be described later, is limited to one unit in a range with a radius of 0.5 km, and thus, a large quantity of the same type of earthquake wave analysis information is not transmitted from a specific region but the earthquake information can be analyzed quickly and accurately.

Condition of $\delta<D/S_P+\Delta t$.

Figure 4:
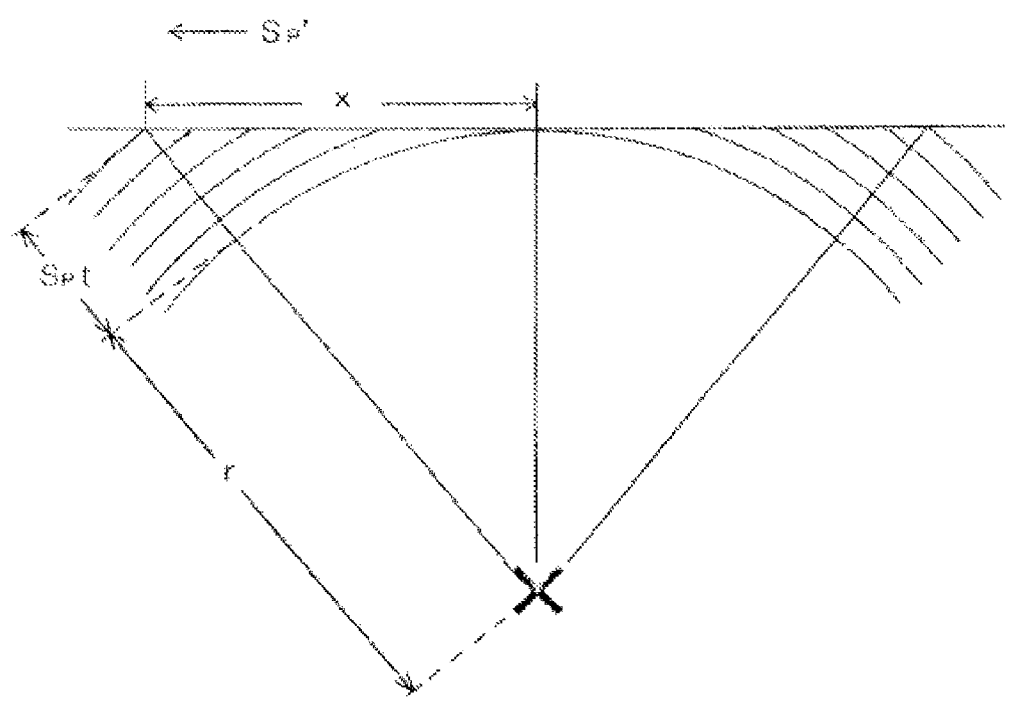
FIG. 4 is an explanatory diagram illustrating a relationship between a depth r of a seismic center and a propagation speed P's of the earthquake P waves propagating on the ground surface.

The propagation speed of the earthquake P waves is different depending on the depth of the seismic center from the ground surface. As illustrated in FIG. 4, when the depth of the seismic center is r, the minimum propagation speed of the earthquake P waves is $S_P$, the propagation speed of the earthquake P waves on the ground surface is $S_P'$, and the distance of the earthquake P waves propagating along the ground surface t seconds after the occurrence of an earthquake is x, it is represented by:

$$S_P'=x/t=(S_P^2+2S_P/t)^{1/2}$$

and the deeper the depth r of the seismic center is, the faster the propagation speed $S_p'$ of the earthquake P waves on the ground surface becomes.

The propagation speed of the earthquake P waves is different depending also on the geological condition/formation through which the earthquake P waves propagate, but even if the seismic center is shallow and the propagation speed $S_p$ of the earthquake P waves is the slowest, it is 5.5 km/s or more and thus, the minimum propagation speed $S_p$ of the earthquake P waves is set to 5.5 km/s, here.

Figure 3:
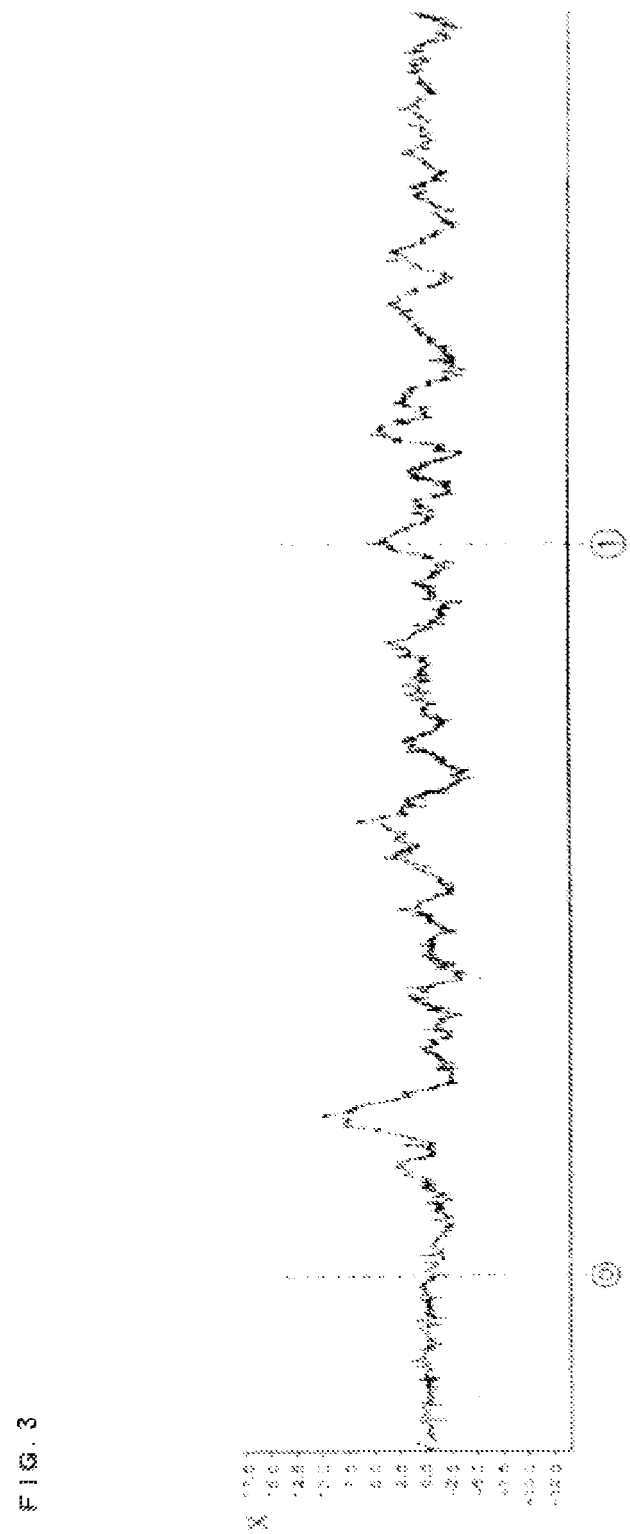
FIG. 3 is an enlarged waveform diagram of a portion obtained by enlarging the vibration waveform in the X-direction in FIG. 2 in the vicinity where earthquake P waves are detected.

Also, the estimated earthquake P waves are determined by the P-wave waveform analysis portion 22 of each observation terminal device 3 through comparison of a change in the vibration frequency or amplitude of a displacement waveform detected by the seismometer 4 with the characteristics of the earthquake P waves, but detection time of the estimated earthquake P waves indicated by a double circle in FIG. 3 cannot be determined accurately from the vibration waveform having passed through the simplified living noise filter 21 from which the living noise has not been fully removed and a certain error might occur. By improving comparison accuracy in comparison with the initial waveform of the earthquake P waves, this error is reduced, but here, the maximum detection error $\Delta t$ between the detection times of the pair of observation terminal devices 3 is set to 0.3 seconds. Therefore, the relationship between the elapsed time since occurrence of an earthquake and the propagation distance from the seismic center considering the maximum detection error $\Delta t$ is represented by a broken line in FIG. 5. When a distance from the observation terminal device 3 to the seismic center is $D_r$ and the elapsed time from occurrence of the earthquake to the detection time when the observation terminal device 3 detects the earthquake P waves is $\delta_0$, it is illustrated that the observation terminal device 3 which detected the earthquake P waves is located in a region on the left side with the boundary of the broken line in FIG. 5, which satisfies:

$$\delta_0<D_r/S_P+\Delta t.$$

Even if the seismic center is unknown and the distance from the seismic center is unknown, either, the distance D between the pair of observation terminal devices 3 and 3 is at least longer than the difference of the distances to the seismic center from the both, and the time interval $\delta$ between the detection times of the earthquake P waves of the pair of observation terminal devices 3 and 3 does not exceed $D/S_P+\Delta t$. Therefore, if the time interval $\delta$ between the detection times of the estimated earthquake P waves exceeds $D/S_P+\Delta t$, the estimated earthquake P waves detected at least at either of the observation terminal devices 3 is living noise, and it can be estimated that the pair of observation terminal devices 3 and 3 which satisfy:

$$\delta<D/S_P+\Delta t$$

detected substantially the same earthquake P waves.

Similarly, regarding another pair of the observation terminal devices 3 and 3, if $2D_{SL}<D$ and $\delta<D/S_P+\Delta t$ are satisfied, it can be estimated that the same earthquake P waves were detected with an extremely high probability, and thus, the earthquake analysis portion 31 determines occurrence of an earthquake if the distance D between each pair of the observation terminal devices in two pairs of combinations of the observation terminal devices 3 satisfies $2D_{SL}<D$ and $\delta<D/S_P+\Delta t$. Here, the two pairs of combinations of the observation terminal devices 3 do not necessarily have to be four different observation terminal devices 3 but one observation terminal device 3 may be one of the two pairs of combinations.

If the earthquake analysis portion 31 determines occurrence of an earthquake, the two pairs of combinations of the observation terminal devices 3 which satisfy $2D_{SL}<D$ and $\delta<D/S_P+\Delta t$ are set as the effective observation terminal devices 3' at the determination and outputs identification code which specifies the effective terminal devices 3' and the estimated P-wave detection information transmitted by the effective terminal devices 3' to the alert distribution processing portion 32.

Also, the earthquake analysis portion 31 receives the earthquake wave analysis information consecutively transmitted from the plurality of effective observation terminal devices 3' . . . , analyzes earthquake occurrence time, a seismic center location, and an earthquake size from the installed position of each effective observation terminal device 3' and the type, amplitude (earthquake intensity), and detection time of the earthquake waves observed by each effective observation terminal device 3' and outputs the analysis result as the earthquake information to the alert distribution processing portion 32. Also, if the earthquake information included in the emergency earthquake alert has been already inputted from the alert distribution processing portion 32 before output to the alert distribution processing portion 32, the earthquake occurrence time, the seismic center location, and the earthquake size of the earthquake information is corrected by the earthquake information obtained by analysis of the earthquake wave analysis information of each of the effective observation terminal devices 3' and 3 . . . , and the earthquake information of the corrected earthquake occurrence time, the seismic center location, and the earthquake size are outputted to the alert distribution processing portion 32.

If the identification code which identifies the effective terminal device 3' and the estimated P-wave detection information transmitted by the effective terminal device 3' is inputted from the earthquake analysis portion 31, the alert distribution processing portion 32 transmits an earthquake occurrence notification including the identification code to the effective terminal device 3' through the internet 2. Also, the alert distribution processor 32 is also connected to the meteorological agency 40 having a seismographic network or any other external agency through a communication network such as a dedicated communication line, and if an emergency earthquake alert is received from such an agency at occurrence of an earthquake, the alert distribution processing portion 32 outputs the earthquake information indicating earthquake occurrence time, seismic center location, and earthquake size included in the emergency earthquake alert to the earthquake analysis portion 31 and also distributes it in the emergency earthquake alert to all the observation terminal devices 3, 3 . . . connected through the internet 2.

However, if the earthquake analysis portion 31 analyzes the earthquake information indicating earthquake occurrence time, seismic center location, and earthquake size on the basis of the earthquake wave analysis information received from the large number of observation terminal devices 3, 3 . . . before the meteorological agency 40 or any other external agency transmits the emergency earthquake alert, the emergency earthquake alert including the analyzed earthquake information is distributed to all the observation terminal devices 3, 3 . . . immediately. Also, if the emergency earthquake alert has been already distributed, more accurate earthquake information of earthquake occurrence time, seismic center location, and earthquake size corrected on the basis of the actual measurement information of the large number of observation terminal devices 3, 3 . . . is re-distributed to all the observation terminal devices 3, 3 . . . .

The earthquake occurrence notification distributed to the specific effective observation terminal device 3' and the emergency earthquake alert distributed to all the observation terminal devices 3, 3 . . . from the alert distribution processing portion 32 include terminal specification information which specify an observation terminal device group requesting transmission of the earthquake wave analysis information. In this embodiment, the specific notification rank is selected by the terminal specification information and the observation terminal device 3 for which the notification rank satisfying the notification rank (LV) is set is specified as an observation terminal device group requesting transmission of the earthquake wave analysis information separately from the determination of the effective observation terminal device 3'. Moreover, if transmission of the earthquake wave analysis information of the earthquake S waves is requested, a code S is added to the terminal specification information. For example, if the notification rank not higher than LV2 is selected for the terminal specification information, the observation terminal device 3 for which LV1 or LV2 is set is specified by the terminal specification information from Table 2.

The individual waveform analysis processing portion 33 transmits an earthquake waveform transmission request to the specific observation terminal device 3 in an arbitrary time zone when a traffic of the internet 2 is small since an earthquake has not occurred or the like, so as to obtain the earthquake waveform information of the earthquake P waves or earthquake S waves stored in the earthquake waveform storage portion 10. The individual waveform analysis processing portion 33 can analyze influences of the propagation speed or attenuation of the earthquake waves according to the crust structure of the area by comparing earthquake waveforms or detection times of the earthquake P waves or earthquake S waves detected by the large number of observation terminal devices 3 around the seismic center location and can utilize the result for analysis of predicted arrival time of earthquake wave or predicted intensity when another earthquake occurs in the vicinity later. Also, by comparing the waveforms of the earthquake P waves or earthquake S waves detected by a specific observation terminal device 3 with the earthquake waveforms detected by the large number of observation terminal devices 3 around it, the vibration number or quake amplification A specific to the installed position can be known, and the notification rank or quake amplification A set for the observation terminal device 3 can be corrected on the basis of the information. The corrected notification rank or quake amplification A is transmitted to the individual information correcting portion 16 of the observation terminal device 3 as described above, and the data stored in the terminal individual information recording portion 12 is rewritten by the corrected notification rank or quake amplification A.

Figure 2:
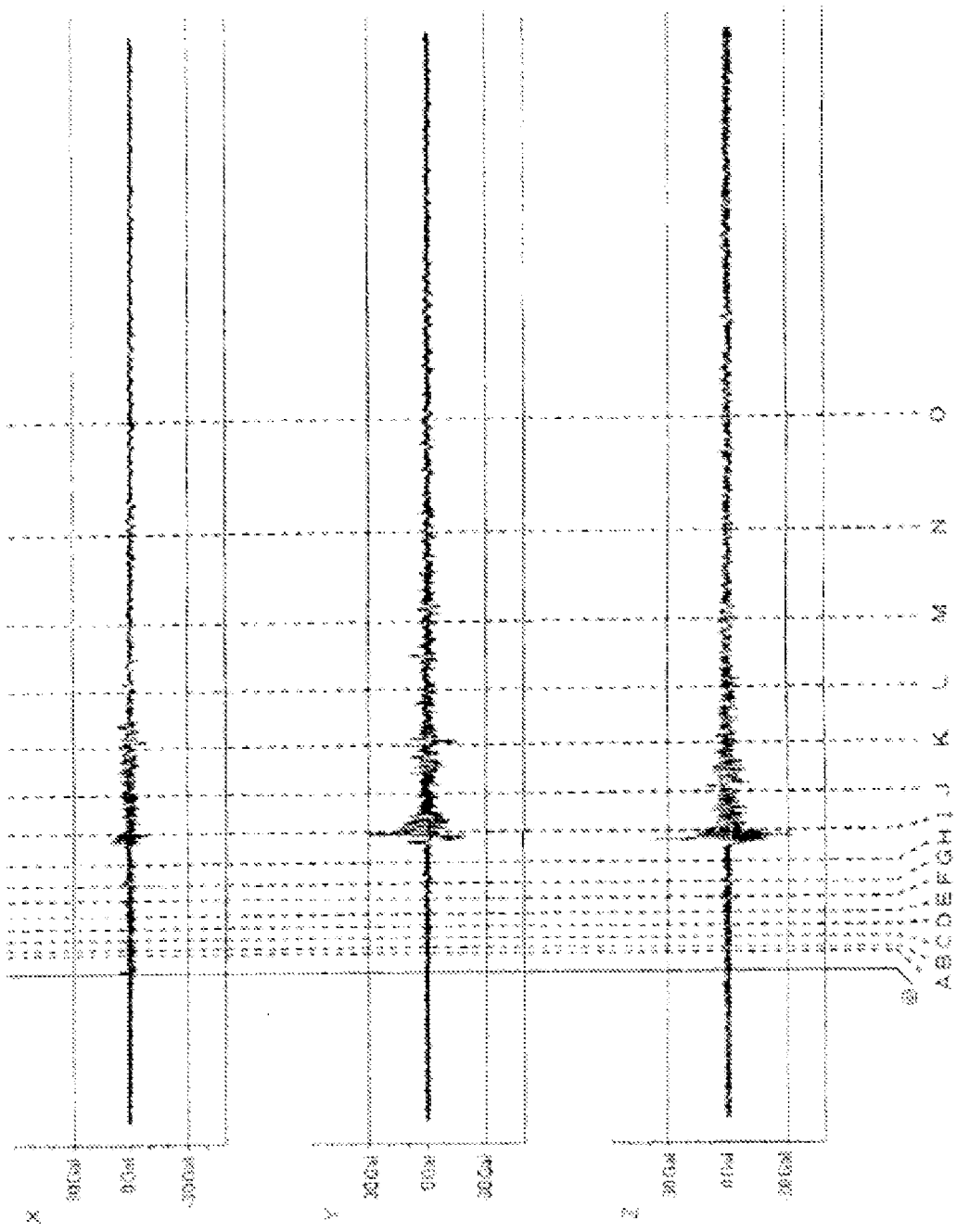
FIG. 2 is waveform diagrams of a vibration waveform in the X-, Y-, and Z-directions outputted from a seismometer 4 of an observation terminal device 3.

Subsequently, a method of determining occurrence of an earthquake and of analyzing earthquake information by the earthquake determination system 1 constituted as above will be described. If an earthquake occurs, the seismometer 4 of the observation terminal device 3 installed at a position close to the seismic center observes a vibration waveform as illustrated in FIG. 2. In FIG. 2, reference characters X, Y, and Z axes represent three axial directions orthogonal to each other, and the X-direction is a perpendicular direction. In general, earthquake P waves have an amplitude in the perpendicular direction larger than in the horizontal direction, and thus, the amplitude of the vibration waveform in the X-direction increases.

FIG. 3 is a partially enlarged waveform diagram in which the vibration waveform in the X-direction in FIG. 2 is enlarged in the vicinity where the earthquake P waves are detected, and since a change in the vibration frequency or amplitude of the illustrated displacement waveform approximates the characteristics of the earthquake P waves, the P-wave waveform analysis portion 22 estimates that the earthquake P waves having detection time of the point indicated by the double circle in the figure is detected and outputs the detection time indicated by the double circle to the transmission determination portion 11. Also, the earthquake waveform information of the earthquake waveform illustrated in FIG. 2 is stored in the earthquake waveform recording portion 10 from the earthquake waveform analysis portion 9.

If the detection time of the estimated earthquake P waves is inputted, the transmission determination portion 11 adds the identification code to the estimated P-wave detection information including the detection time and the installed position information of the observation terminal device 3 to the seismic analysis processor 30 and thus, if an earthquake occurs, a plurality of pieces of the estimated P-wave detection information are transmitted from the plurality of observation terminal devices 3 which similarly detected the earthquake P waves in the vicinity of the seismic center to the seismic analysis processor 30.

Subsequently, a method in which the earthquake analysis portion 31 of the seismic analysis processor 30 detects occurrence of an earthquake on the basis of the estimated P-wave detection information received from the plurality of observation terminal devices 3 (indicted merely as terminals a, b, c, and d in FIG. 6) will be described by using FIG. 6 and an earthquake with a magnitude of 4.4 which actually occurred at the depth of 70 km in the southern part of Ibaraki Prefecture on Feb. 20, 2009 as an example.

The earthquake occurrence time was 18:17:21.0 (hour: minute:second), and the earthquake analysis portion 31 received the estimated P-wave detection information having the detection time of the estimated earthquake P waves of 18:17:30.507 from the terminal a as illustrated in FIG. 6(a) and then, as illustrated in FIG. 6(b), received the estimated P-wave detection information having the detection time of the estimated earthquake P waves of 18:17:30.536 from the terminal b separated from the installed position of the terminal a by 2.8 km.

In this embodiment, the earthquake analysis portion 31 continuously stands by until the estimated P-wave detection information is transmitted from another observation terminal device 3 and starts determination of an earthquake when the estimated P-wave detection information having the detection time of the estimated earthquake P waves of 18:17:30.553 is received from the terminal c illustrated in FIG. 6(c).

Regarding a pair of combination of the terminals a and c, a distance $D_{ac}$ between the pair of terminals a and c is 2.1 km and a time interval $\delta_{ac}$ between the detection times is 0.046 sec according to the installed position information and the detection time of the estimated earthquake P waves included in the estimated P-wave detection information of the both. Therefore, $D_{ac}/S_P$ is 2.1/5.5=0.38 sec and satisfies $2D_{SL}<D_{ac}$ and $\delta_{ac}<D_{ac}/S_P+\Delta t$ without considering presence of the maximum detection error $\Delta t$ between detection times of the pair of terminals a and c.

Subsequently, regarding a pair of combination of the terminals b and c, a distance $D_{bc}$ between the pair of terminals b and c is 2.3 km and a time interval $\delta_{bc}$ between the detection times is 0.017 sec according to the installed position information and the detection time of the estimated earthquake P waves included in the estimated P-wave detection information of the both. Therefore, $D_{bc}/S_P$ is 2.3/5.5=0.418 sec and satisfies $2D_{SL}<D_{bc}$ and $\delta_{bc}<D_{bc}/S_P+\Delta t$ without considering presence of the maximum detection error $\Delta t$ between detection times of the pair of terminals b and c.

Therefore, since each combination of the two pairs (the terminals a and c and the terminals b and c) satisfies $2D_{SL}<D$ and $\delta<D/S_P+\Delta t$ (hereinafter referred to as a determination condition), respectively, the earthquake analysis portion 31 determines occurrence of an earthquake while the seismic center location is still unknown and outputs identification codes which specify the terminals a, b, and c as the effective observation terminal devices 3' and the estimated P-wave detection information transmitted by the terminals a, b, and c to the alert distribution processing portion 32. The alert distribution processing portion 32 transmits an earthquake occurrence notification including the identification code to the terminals a, b, and c, and the earthquake occurrence notification includes the terminal specification information which specifies an observation terminal device group requesting transmission of the earthquake wave analysis information from all the effective observation terminal devices 3'.

If none of the two pairs of combinations (the terminals a and c and the terminals b and c) satisfies the determination condition, the earthquake analysis portion 3 resets determination of earthquake and invalidates the estimated P-wave detection information having been received so far.

Also, if either one (the pair of the terminals a and c, for example) of the two pairs of combinations (the terminals a and c and the terminals b and c) does not satisfy the determination condition, the earthquake analysis portion 31 further waits for the estimated P-wave detection information transmitted from another observation terminal device 3 and if the estimated P-wave detection information is not received from a new observation terminal device 3 even if a predetermined time of one minute has elapsed, for example, the earthquake analysis portion 31 similarly resets the determination of earthquake and invalidates the estimated P-wave detection information having been received so far.

As illustrated in FIG. 6(d), if the estimated P-wave detection information of the estimated earthquake P waves having the detection time of 18:17:30.611 is further received from a new terminal d within the above predetermined time, with respect to the pair of terminals a and c which did not satisfy the determination condition, the remaining terminal b and the terminal d are made a pair of combination and compared under the determination condition. Since a distance $D_{bd}$ between the pair of terminals b and d is 5.3 km and a time interval $\delta_{bd}$ between the detection times is 0.075 sec, $D_{bd}/S_P$ is 5.3/5.5=0.96 sec and satisfies the determination condition without considering presence of the maximum detection error $\Delta t$ between detection times of the pair of terminals b and d. Therefore, since each of the two pairs of the combinations (the terminals b and c and the terminals b and d) satisfies the determination condition, respectively, the earthquake analysis portion 31 determines occurrence of an earthquake and outputs the identification code which specifies the terminals b, c, and d as the effective observation terminal devices 3' and the estimated P-wave detection information transmitted by the terminals b, c, and d to the alert distribution processing portion 32.

If one pair of the terminals b and d does not satisfy the determination condition, the estimated P-wave detection information further transmitted from another observation terminal device 3 is awaited for the above predetermined time and the similar processing is repeated.

Also, even after both the two pairs of combinations satisfy the determination condition and occurrence of an earthquake is determined, the earthquake analysis portion 31 waits for the estimated P-wave detection information further transmitted from another observation terminal device 3 for the above predetermined time, and if it is found from the received estimated P-wave determination information, that there is an observation terminal device 3 forming a pair with the effective observation terminal device 3' and satisfying the determination condition, the observation terminal device 3 is also set as the effective observation terminal device 3', and the earthquake analysis portion 31 outputs an identification code which specifies the observation terminal device 3 set as the effective observation terminal device 3' and the estimated P-wave detection information transmitted by the terminal 3 to the alert distribution processing portion 32.

By using the above-described earthquake determination method, the earthquake analysis portion 31 determined the above earthquake which occurred at 18:17:21.0 on Feb. 20, 2009 to be an earthquake at 18:17:31.149, 6 seconds before 18:17:37 when the first emergency earthquake alert was received from the meteorological agency.

The alert distribution processing portion 32 transmits an earthquake occurrence notification to the terminal newly set as the effective observation terminal device 3' similarly to the terminal which has been already set as the effective observation terminal device 3', but the terminal specification information which reduces the number of observation terminal devices 3 requesting transmission of the earthquake wave analysis information in accordance with the elapsed time till the estimated P-wave detection information of the effective observation terminal device 3' from determination of occurrence of the earthquake is newly received is included in the earthquake occurrence notification.

If each observation terminal device 3 set as the effective observation terminal device 3' in the earthquake analysis portion 31 receives the earthquake occurrence notification including the identification code from the alert distribution processing portion 32 of the seismic analysis processor 30, the earthquake waveform analysis portion 9 reads out the vibration waveform information of the estimated P-wave detection information transmitted on the basis of the identification code from the earthquake waveform recording portion 10 and consecutively analyzes the characteristics of the earthquake waveform illustrated in Table 3, such as type, amplitude, acceleration, detection time and the like of the earthquake waveform at the times of A to O in FIG. 2, for example, and outputs the result as earthquake wave analysis information to the transmission determination portion 11.

TABLE 3

| Time and date of notification | Order | P-wave intensity | P-wave Gal | Predicted intensity | S-wave intensity | S-wave Gal |
|---|---|---|---|---|---|---|
| 2009 Feb. 17 04:54:36.257 | A | 1.05 | 1.14 | 2.05 | 1.05 | 1.14 |
| 2009 Feb. 17 04:54:36.548 | B | 1.05 | 1.14 | 2.05 | 1.05 | 1.14 |
| 2009 Feb. 17 04:54:36.949 | C | 1.05 | 1.14 | 2.05 | 1.05 | 1.14 |
| 2009 Feb. 17 04:54:37.499 | D | 1.05 | 1.14 | 2.05 | 1.05 | 1.14 |
| 2009 Feb. 17 04:54:38.049 | E | 1.11 | 1.22 | 2.11 | 1.11 | 1.22 |
| 2009 Feb. 17 04:54:38.760 | F | 1.11 | 1.22 | 2.11 | 1.11 | 1.22 |
| 2009 Feb. 17 04:54:39.661 | G | 1.16 | 1.29 | 2.16 | 1.16 | 1.29 |
| 2009 Feb. 17 04:54:40.761 | H | 1.11 | 1.22 | 2.11 | 1.25 | 1.43 |
| 2009 Feb. 17 04:54:42.161 | I | 1.32 | 1.55 | 2.32 | 2.88 | 9.34 |
| 2009 Feb. 17 04:54:43.961 | J | 1.32 | 1.55 | 2.32 | 2.97 | 10.37 |
| 2009 Feb. 17 04:54:46.161 | K | 1.32 | 1.55 | 2.32 | 2.97 | 10.37 |
| 2009 Feb. 17 04:54:48.961 | L | 1.32 | 1.55 | 2.32 | 3.01 | 10.89 |
| 2009 Feb. 17 04:54:52.462 | M | 1.32 | 1.55 | 2.32 | 3.01 | 10.89 |
| 2009 Feb. 17 04:54:56.761 | N | 1.32 | 1.55 | 2.32 | 3.01 | 10.89 |
| 2009 Feb. 17 04:55:02.162 | O | 1.32 | 1.55 | 2.32 | 3.01 | 10.89 |

If the notification rank read out of the terminal individual information recording portion 12 is the notification rank specified in the terminal specification information included in the earthquake occurrence notification (LV1, for example), the transmission determination portion 11 transmits the earthquake wave analysis information of the earthquake P waves to the seismic analysis processor 30. That is, the number of the observation terminal devices 3 which detect the earthquake P waves increases, if distributed uniformly, in proportion to the square of the elapsed time from the earthquake occurrence time and the number of the observation terminal devices 3 to transmit the earthquake wave analysis information as the effective observation terminal device 3' also dramatically increases and thus, the notification rank (LV) to be selected by the terminal specification information is adjusted in accordance with the elapsed time from determination of occurrence of the earthquake so as to reduce the number of observation terminal devices to transmit the earthquake wave analysis information and to make a transmission amount to be transmitted to the seismic analysis processor 30 through the internet 2 constant.

The earthquake analysis portion 31 analyzes the earthquake occurrence time, the seismic center location (See FIG. 6(d)), and the earthquake size from the installed position of each of the effective observation terminal devices 3' and the type, amplitude (earthquake intensity), and detection time of the observed earthquake waves on the basis of the earthquake wave analysis information transmitted from the plurality of effective observation terminal devices 3' specified by the terminal specification information and outputs the analysis result as the earthquake information to the alert distribution processing portion 32, and the alert distribution processing portion 32 distributes the earthquake information to each of the observation terminal devices 3 requiring notification.

Also, if the earthquake information included in the emergency earthquake alert has been already inputted from the alert distribution processing portion 32 before output to the alert distribution processing portion 32, the earthquake occurrence time, the seismic center location, and the earthquake size of the earthquake information are corrected by the earthquake information obtained by analysis of the earthquake wave analysis information of each of the effective observation terminal devices 3', 3 . . . , and the corrected earthquake information of the earthquake occurrence time, the seismic center location, and the earthquake size is transmitted from the alert distribution processing portion 32 to each of the observation terminal devices 3.

According to this embodiment, if the detection time of the estimated earthquake P waves is inputted from the P-wave waveform analysis portion 22, the transmission determination portion 11 of the observation terminal device 3 unconditionally transmits the detection time and the estimated P-wave detection information including the installed position information of the seismometer 4 of the observation terminal device 3 thereof to the seismic analysis processor 30. As a result, if the seismographic observation network formed of the plurality of observation terminal devices 3, 3 . . . detects earthquake P waves before the meteorological agency 40 or any other external agency transmits an emergency earthquake alert, occurrence of an earthquake can be quickly detected without an error, and also, after that, the earthquake information of the earthquake which occurred can be analyzed, and no false emergency earthquake alert is issued.

In the above-described embodiment, the example was explained in which besides the simplified earthquake determination portion 22 which estimates detection of the earthquake P waves, each of the observation terminal devices 3 is provided with the earthquake waveform recording portion 10 which stores the vibration waveform information outputted by the seismometer 4 and the earthquake waveform analysis portion 9 which analyzes the earthquake waveform from the vibration waveform information if the estimated earthquake P waves are earthquake P waves, but it may be the observation terminal device 3 which only transmits the estimated earthquake P waves with the purpose of determining only occurrence of an earthquake without the earthquake waveform recording portion 10 or the earthquake waveform analysis portion 9.

Also, the seismic analysis processor 30 and each of the observation terminal devices 3, 3 . . . may be connected to each other through other communication networks such as a LAN, a dedicated line and the like other than the internet.

INDUSTRIAL APPLICABILITY

The present invention is suitable for an earthquake analysis method which determines occurrence of an earthquake at an early stage and accurately and notifies earthquake information of earthquake occurrence time, seismic center location, and earthquake size without an error immediately after occurrence of the earthquake.

REFERENCE SIGNS LIST 1 earthquake determination system
2 internet (communication network)
3 observation terminal device
3' effective observation terminal device
4 seismometer
9 earthquake waveform analysis portion
22 P-wave waveform analysis portion (simplified earthquake determination portion)
30 seismic analysis processor
31 earthquake analysis portion

The invention claimed is:

1. An earthquake determination system in which a plurality of observation terminal devices installed in a dispersed manner at random areas and a seismic analysis processor are connected by a communication network, and the seismic analysis processor determines occurrence of an earthquake on the basis of vibration observation information transmitted through the communication network by the observation terminal device which observed vibration at an installed position, characterized in that each observation terminal device includes a seismometer which outputs vibration waveform information at the installed position and a simplified earthquake determination portion which estimates detection of earthquake P waves from the vibration waveform information outputted by the seismometer and transmits estimated P-wave detection information including detection time of the estimated earthquake P waves and installed position information thereof as the vibration observation information to the seismic analysis processor, when the simplified earthquake determination portion estimates detection of the earthquake P waves;

the seismic analysis processor includes an earthquake analysis portion which determines occurrence of an earthquake from the received estimated P-wave detection information, when the estimated P-wave detection information is received from a plurality of the observation terminal devices;

the earthquake analysis portion acquires a distance D between the observation terminal devices and a time interval δ between detection times from the detection time of the estimated earthquake P waves and installed position information included in each pair of the estimated p-wave detection information regarding at least two pairs of combinations of the observation terminal devices among the plurality of observation terminal devices which transmitted the estimated P-wave detection information; and when a transmission limit distance of local vibration energy is $D_{SL}$, a minimum propagation speed of the earthquake P waves is $S_P$, and a maximum detection error between detection times by the pair of observation terminal devices is $\Delta t$, if the both of the two pairs of combinations the observation terminal devices satisfy relationships of $2D_{SL} < D$ and $\delta < D/S_P + \Delta t$, it is determined to be occurrence of an earthquake.

2. The earthquake determination system according to claim 1, wherein the two pairs of combinations are formed, among three observation terminal devices Ln, Ln+1, and Ln+2 from which the seismic analysis processor has continuously received the estimated P-wave detection information, the observation terminal device Ln+2 which received the information in the third place and either one of the remaining two observation terminal devices Ln and Ln+1 as the other of one pair, respectively.

3. A seismic analysis method in which a plurality of observation terminal devices installed in a dispersed manner at random areas and a seismic analysis processor are connected through a communication network and the seismic analysis processor analyzes an occurrence situation of an earthquake on the basis of vibration observation information transmitted through the communication network by the observation terminal device which observed vibration at the installed position, characterized in that:

(1) the observation terminal device provided with a seismometer which outputs vibration waveform information at the installed position and a simplified earthquake determination portion which estimates detection of the earthquake P waves from the vibration waveform information outputted by the seismometer transmits estimated P-wave detection information including detection time of the estimated earthquake P waves and the installed position information of itself as the vibration observation information to the seismic analysis processor if the simplified earthquake determination portion estimates detection of the earthquake P waves;

(2) when the estimated P-wave detection information is received from the plurality of observation terminal devices, the seismic analysis processor acquires a distance D between the observation terminal devices and the time interval δ between detection times from the detection time of the estimated earthquake P waves and installed position information included in each pair of the estimated P-wave detection information regarding at least two pairs of combinations of the observation terminal devices among the plurality of observation terminal devices which transmitted the estimated P-wave detection information; and when a transmission limit distance of local vibration energy is $D_{SL}$, a minimum propagation speed of the earthquake P waves is $S_P$, and a maximum detection error between detection times by the pair of observation terminal devices is $\Delta t$, if the both of the two pairs of combinations of the observation terminal devices satisfy relationships of $2D_{SL} < D$ and $\delta < D/S_P + \Delta t$, it is determined to be occurrence of an earthquake.

4. The seismic analysis method according to claim 3, wherein (3) the observation terminal device has an earthquake waveform analysis portion continuously analyze the vibration waveform information outputted by the seismometer along with the above (1) at least from the estimated earthquake P-wave detection time;

(4) the seismic analysis processor sets each pair of observation terminal devices as effective observation terminal devices when determination to be occurrence of an earthquake in the above (2) is made and notifies the effective observation terminal devices that the estimated earthquake P waves are the earthquake P waves;

(5) the earthquake waveform analysis portion of the effective observation terminal device which receives the notification of the above (4) from the seismic analysis processor, obtains the earthquake wave analysis information by waveform analysis of the earthquake waves continued from the estimated earthquake P waves as the earthquake P waves; and the effective observation terminal device consecutively transmits the earthquake wave analysis information as vibration observation information to the seismic analysis processor; and (6) the seismic analysis processor analyzes earthquake occurrence time, seismic center location, and earthquake size on the basis of the earthquake wave analysis information transmitted from the effective observation terminal devices.

5. The seismic analysis method according to claim 4, wherein (7) when the seismic analysis processor receives the estimated P-wave detection information from the observation terminal device different from the effective observation terminal device in the above (4), the seismic analysis processor acquires a distance $D'$ between the observation terminal devices and a time interval $\delta'$ between the detection times from the detection time of the estimated earthquake P waves and the installed position information included in the pair of the estimated P-wave detection information received from the observation terminal device and one of the effective observation terminal devices; and if the pair of observation terminal device and the one effective observation terminal device satisfy $2D_{SL} < D'$ and $\delta' < D'/S_P + \Delta t$, the observation terminal device is added to the effective observation terminal devices, and the above (4) to (6) are performed.

* * * * *